United States Patent [19]
Bruhn et al.

[11] Patent Number: 6,163,325
[45] Date of Patent: *Dec. 19, 2000

[54] FLUSH-MOUNTED MULTI-CHANNEL PRINTER

[75] Inventors: Arno Bruhn, Wülfrath; Hans-Herbert Kirste, Landesbergen, both of Germany

[73] Assignee: Hartmann & Braun Aktiengesellschaft, Frankfurt am Main, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,736

[22] Filed: Oct. 18, 1996

[30] Foreign Application Priority Data

Oct. 18, 1995 [DE] Germany ............................ 195 40 218

[51] Int. Cl.[7] ...................................... B41J 29/16

[52] U.S. Cl. .............................................. 346/80

[58] Field of Search .................... 346/80, 30; 364/518, 364/550; 348/571; 179/7.1; 395/325

[56] References Cited

U.S. PATENT DOCUMENTS

| | | | |
|---|---|---|---|
| 4,858,153 | 8/1989 | Ziegler et al. | 364/550 |
| 4,905,165 | 2/1990 | Inden et al. | 364/518 |
| 5,319,754 | 6/1994 | Meinecke et al. | 395/325 |
| 5,506,635 | 4/1996 | Vorwerk | 348/571 |

*Primary Examiner*—N. Le
*Assistant Examiner*—Anh T. N. Vo
*Attorney, Agent, or Firm*—Michael M. Rickin

[57] ABSTRACT

A multi-channel printer with a time profile recorder for recording time profiles of measured values and electrical connectors for detachable connection of signal connecting leads for measured value sources which is installed in grid-based switch panels or control panels. In further developing of such a flush-mounted printer in such a manner that the number of connecting elements available for signals supplied on separate leads is as high as possible despite the limited rear area will be proposed in the invention, that the time profile recorder (11) for recording time profiles of measured values and the electrical connector (12) for the detachable connection of signal connecting leads (3) for measured value sources are physically separated and are electrically connected to one another via connecting leads (13).

15 Claims, 2 Drawing Sheets

FLUSH-MOUNTED MULTI-CHANNEL PRINTER

FIELD OF THE INVENTION

This invention relates to a flush-mounted multi-channel printer which is installed in grid-based switch panels or control panels.

DESCRIPTION OF THE PRIOR ART

Flush-mounted multi-channel printers that are installed in grid-based switch panels or control panels are known, for example, from the Hartmann & Braun AG List Sheet 40-1.10 as Arucomp EK-Ex.A dot-matrix printers.

Based on a fundamental grid size of 12 mm, a front area of 144 mm×144 mm, which covers 12 grid divisions in both height and width, has been used in the past as the sensible smallest format for such flush-mounted printers. Larger flush-mounted printers have a front area which is an integer multiple of the smallest format, normally in width.

Immediately adjacent grid locations of such flush-mounted printers are regularly fitted with other assemblies or equipment, so that only the rear surface, which essentially has the same area as the front surface, can be used for connecting leads for the power supply and for supplying measured values.

As the complexity of measured value conditioning and processing in such a flush-mounted printer increases and, in particular, in an environment where there is an explosion risk and in which connecting elements for supply leads have a predetermined minimum size in order to achieve specified air gaps and leakage paths, it is no longer possible to position all the required connecting elements on the available rear surface of a flush-mounted printer of the smallest format. The number of signals which can be supplied thus lags behind the processing capabilities of such flush-mounted printers.

For compatibility reasons, any matched enlargement in the area of the rear surface of the flush-mounted printer is precluded since only the existing cutout in the switch panel or the control panel is available, particularly when replacing an existing flush-mounted printer by a new flush-mounted printer having upgraded equipment features. Therefore, it is desirable to develop such a flush-mounted printer in such a manner that the number of connecting elements available for signals supplied on separate leads is as high as possible despite the limited rear area.

The present invention is embodied as a multi-channel printer that has one or more concentrators receiving measured values from sources. The measured values are detachably connected to the one or more concentrators by individual signal leads. The one or more concentrators each have at least one multi-pole group connection which includes at least enough connectors so that there is an individual one of each of the connectors associated with an individual one of the measured values from sources. The printer also has a recorder for recording time profiles of the measured values from sources. The recorder has a rear that is limited in area. The rear has at least one multi-pole group connection which is electrically connected to the at least one multi-pole group connection of the one or more concentrators. The multi-pole group connector of the recorder has at least enough connectors so that there is an individual one of each of the connectors of the at least one multi-pole group connector of the recorder associated with a respective one of the connectors of said at least one multi-pole group connection of the one or more concentrators.

The present invention is also embodied as a flush-mounted multi-channel printer. The printer has one or more concentrators each of which have at least one multi-pole group connection. Each of the concentrators has means for the detachable connection of individual signal connecting leads from measured value sources. Each of the at least one multi-pole group connection have at least enough connectors so that there is an individual one of the connectors associated with a respective one of said individual signal connecting leads. The printer also has a time profiles recorder of measured values for installation in a panel. The printer has a rear with a multi-pole group connection that has at least enough connectors so that there is an individual one of each of the connectors of the recorder multi-pole group connection associated with a respective one of the connectors of the at least one multi-pole group connection of the one or more concentrators. The printer further has means for electrically connecting the recorder multi-pole group connection and the at least one multi-pole group connection of the one or more concentrators.

DESCRIPTION OF THE PREFERRED EMBODIMENT(S)

Figure 1:
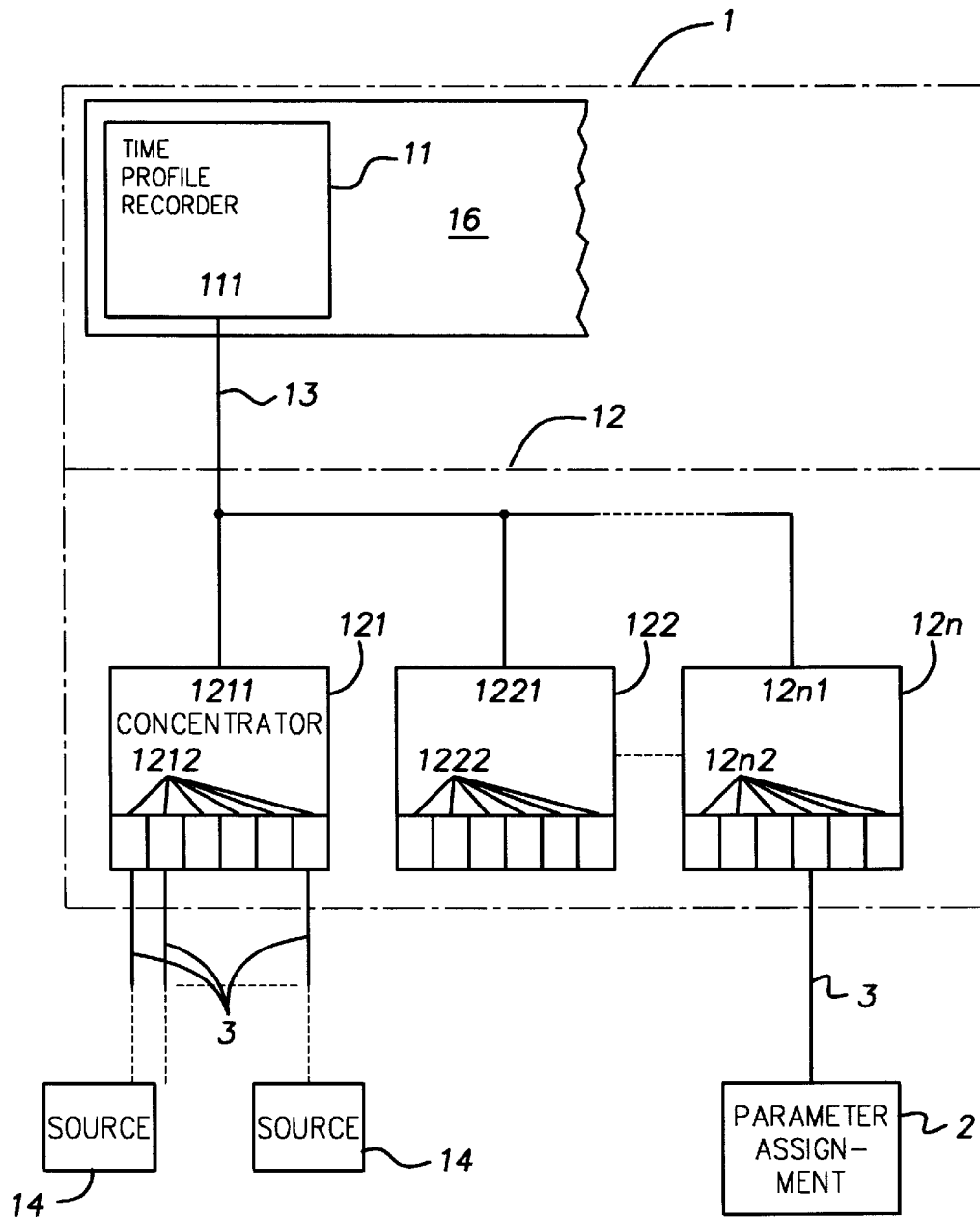
FIG. 1 shows a block diagram of a printer.

FIG. 1 shows a block diagram of a multi-channel printer 1, called the printer 1 from now on, which has means 11 for recording time profiles of measured values and means 12 for the detachable connection of signal connecting leads 3 for measured value sources 14. The means 11 for recording time profiles is shown in FIG. 1 flush-mounted in an aperture of panel 16 only a portion of which is shown in FIG. 1. The means 11 for recording time profiles of measured values in this case comprise all those devices which are known per se and are not specified in any more detail for the purposes of this description, for feeding, transporting and storing a recording medium, for conversion of electrical measured value signals into equivalent position movements of associated recording elements transversely with respect to the transport direction of the recording medium, and the stamping action of the recording elements for recording information items, which are equivalents of the measured value signals, on the recording medium, and for treating and processing the measured value signals, such that parameters can be assigned, including, where provided, limit value monitoring and indication related to the measured values.

The means 12 for the detachable connection of signal connecting leads 3 comprise the totality of the physical elements for making electrical contact with separate signal connecting leads 3 for the transmission of measured value signals between measured value sources 14 and the printer 1, such as terminal arrangements, plug-in contact devices, wound connections and/or soldered connections. Furthermore, the means 12 for the detachable connection of separate signal connecting leads can be provided for the outgoing transmission of message signals from the printer 1 to a message signal receiving device which is not illustrated.

The subject matter of the invention provides that the means 11 for recording time profiles of measured values and the means 12 for the detachable connection of signal connecting leads 3 are physically separated and are electrically connected to one another via connecting leads 13.

The means 12 for the detachable connection of signal connecting leads 3 are combined in at least one concentrator 121 to 12n, each concentrator 121 to 12n having a plurality of connecting elements 1212 to 12n2 for the detachable connection of signal connecting leads 3.

In consequence, the means 12 for the detachable connection of signal connecting leads 3 can advantageously be positioned largely freely and, with respect to their physical dimensions, irrespective of physical limitations predetermined by switch panel apertures, such that, particularly in the case of miniature flush-mounted multi-channel printers, it is possible to connect more signal connecting leads 3 than the number of connecting elements 1212 to 12n2 which can be arranged on the rear surface of a known printer.

Furthermore, a printer 1 of such a design can be of modular configuration without affecting the physical arrangement of the means 11 for recording time profiles of measured values, by further concentrators 122 to 12n being added to the means 12 for the detachable connection of signal connecting leads 3.

Figure 3:
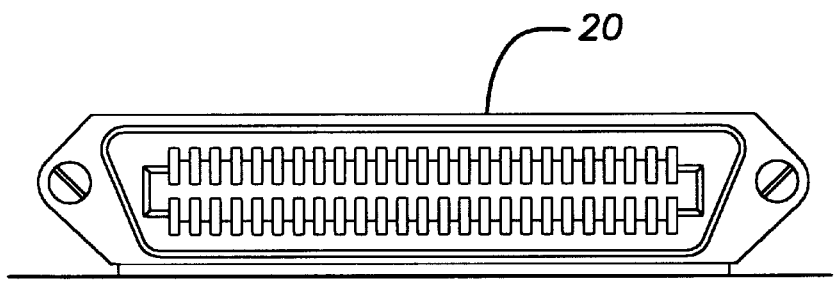
FIG. 3 shows a front view of one part of a multi-pole group connector.

A further refinement of the invention provides that the means 12 for the detachable connection of signal connecting leads 3 and the means 11 for recording time profiles of measured values are each equipped with at least one multipole group connection 111, 1211 to 12n1. Such multi-pole group connections are well known to those of ordinary skill in the art as having a male part which mates with a female part. One example of such a connection 20 is shown in FIG. 3. The connection 20 may be either a male or female multi-pole group connection which mates as well known in the art to a complementary female or male multi-pole group connection (not shown). These group connections 111, 1211 to 12n1 are preferably designed as detachable connections. In this case, the means 11 for recording and the means 12 for the detachable connection of signal connecting leads 3 can advantageously be fitted independently of one another and can be electrically connected to one another in the fitted state.

Figure 2:
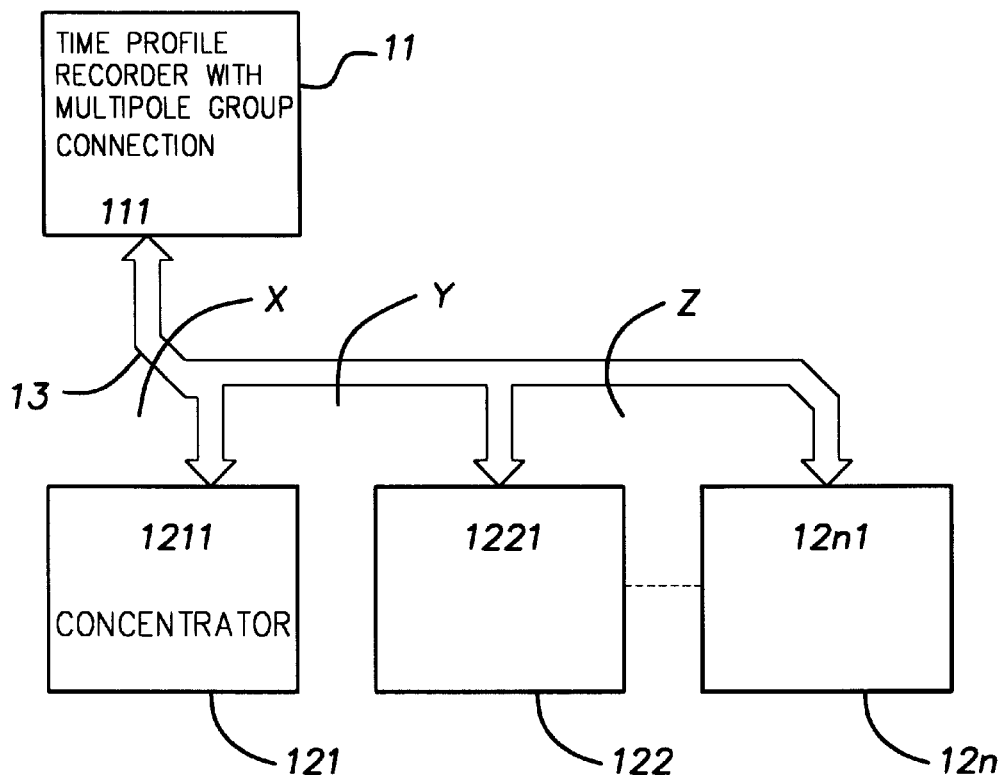
FIG. 2 shows a communications layout for a printer.

One embodiment of the invention provides that the multipole group connection 111 of the means 11 for recording time profiles of measured values is designed as a physical multiplex of the signal connecting leads 3 which are connected to each concentrator 121 to 12n. A communications layout for such a printer is illustrated for this purpose in FIG. 2 using the same reference symbols for the same means. The means 11 for recording time profiles of measured values are connected to the concentrators 121 to 12n via m connecting leads 13 which are connected to the group connection 111. The loom of connecting leads between the first concentrator 121 and the second concentrator 122 has n wires and the loom of the connecting lead 13 between the second concentrator 122 and the subsequent concentrator 12n has p wires.

In the case of concentrators 121 to 12n which are connected as a physical multiplex, x>y>z, x-y connecting leads 13 being connected to the group connection 1211 of the first concentrator 121, and y-z connecting leads 13 being connected to the group connection 1221 of the second concentrator 122. In the case of n=3 concentrators 121 to 12n, z connecting leads 13 are connected to the group connection 12n1. The individual concentrators 121 to 12n are advantageously logically independent of one another. Another embodiment of the invention provides that the multipole group connection 111 of the means 11 for recording time profiles of measured values is designed as a time multiplex. In this case, with reference to FIG. 2, x=y=z, that is to say the loom of the connecting leads 13 which are connected to the group connection 111 of the means 11 for recording time profiles of measured values is fully connected to each group connection 1211 to 12n1 of each concentrator 121 to 12n. In this case, the connecting leads 13 are provided, successively in time, for the connection of the means 11 for recording time profiles of measured values to each means 12, 121 to 12n for the detachable connection of signal connecting leads 3.

Even a small number of parallel connecting leads 13 are in this case advantageously sufficient for the connection of any desired number of concentrators 121 to 12n. Furthermore, a printer 1 designed in this way can be upgraded at any time, in a modular form, by the addition of further concentrators without affecting the structure of the connecting leads 13.

It is furthermore provided that an external parameter assignment device 2 can be connected to at least one of the concentrators 121 to 12n. A variable assignment of the measured value sources, of the various recording channels, corresponding to the current requirements, can thus advantageously be implemented without affecting the printer 1.

It can furthermore be provided that, in addition to the connecting elements 1212 to 12n2 for signal connecting leads 3 for measured values which are configured logically as inputs, the concentrators 121 to 12n also have such connecting elements for message signals, which are logically configured as outputs, to a hierarchically higher-level device. The input/output characteristics of the concentrators 121 to 12n are in this case expediently unified. Cost-effective, modular configuration variants of such a printer 1 can thus advantageously be implemented.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A multi-channel printer comprising:

a) one or more concentrators receiving measured values from sources, said measured values detachably connected by individual signal leads to said one or more concentrators, said one or more concentrators each having at least one multi-pole group connection which includes at least enough connectors so that there is an individual one of each of said connectors associated with an individual one of said measured values from sources; and b) means for recording time profiles of said measured values from sources, said means having a rear that is limited in area, said rear having at least one multi-pole group connection which is electrically connected to said at least one multi-pole group connection of said one or more concentrators and has at least enough connectors so that there is an individual one of each of said connectors of said at least one multi-pole group connector of said means for recording time profiles associated with a respective one of said connectors of said at least one multi-pole group connection of said one or more concentrators.

2. The multi-channel printer of claim 1 wherein said means for recording time profiles has recording channels and said sources are assigned to said recording channels and an assignment is adjustable by a parameter assignment device connected to at least one of said one or more concentrators.

3. The multi-channel printer of claim 1 wherein said means for recording time profiles of measured values from sources is flush-mounted in a panel.

4. The multi-channel printer of claim 1 wherein each of said one or more concentrators is at locations which are physically separated from said means for recording time profiles and each of said one or more concentrators has a plurality of connecting elements for detachably connecting said individual signal leads.

5. The multi-channel printer of claim 4 wherein said means for recording time profiles of measured values from sources is flush-mounted in a panel.

6. The multi-channel printer of claim 4 wherein said means for recording time profiles has recording channels and said sources are assigned to said recording channels and an assignment is adjustable by a parameter assignment device connected to at least one of said one or more concentrators.

7. The multi-channel printer of claim 4 wherein said at least one multipole group connection of said means for recording time profiles is a time multiplex so that said leads received from said one or more concentrators are connected successively in time said rear connections of said time profile recording means.

8. The multi-channel printer of claim 7 wherein said means for recording time profiles has recording channels and said sources are assigned to said recording channels and an assignment is adjustable by a parameter assignment devices connected to at least one of said one or more concentrators.

9. The multi-channel printer of claim 1 wherein said at least one multipole group connection of said one or more concentrators is a physical multiplex of said individual signal leads which are connected to each of said one or more concentrators.

10. The multi-channel printer of claim 9 wherein said means for recording time profiles has recording channels and said sources are assigned to said recording channels and an assignment is adjustable by a parameter assignment device connected to at least one of said one or more concentrators.

11. The multi-channel printer of claim 9 wherein said means for recording time profiles of measured values is flush-mounted in a panel.

12. The multi-channel printer of claim 1 wherein said at least one multipole group connection of said means for recording time profiles is a time multiplex so that said leads received from said one or more concentrators are connected successively in time said rear connections of said time profile recording means.

13. The multi-channel printer of claim 12 wherein said means for recording time profiles has recording channels and said sources are assigned to said recording channels and an assignment is adjustable by a parameter assignment device connected to at least one of said one or more concentrators.

14. The multi-channel printer of claim 12 wherein said means for recording time profiles of measured values is flush-mounted in a panel.

15. A flush-mounted multi-channel printer comprising:
a) one or more concentrators each having at least one multi-pole group connection and means for the detachable connection of individual signal connecting leads from measured value sources, each of said at least one multi-pole group connection having at least enough connectors so that there is an individual one of said connectors associated with a respective one of said individual signal connecting leads;
b) means for recording time profiles of measured values for installation in a panel and having a rear with a multi-pole group connection which has at least enough connectors so that there is an individual one of each of said connectors of said multi-pole group connection of said means for recording time profiles associated with a respective one of said connectors of said at least one multi-pole group connection of said one or more concentrators; and
c) means for electrically connecting said multi-pole group connection of said means for recording time profiles and said at least one multi-pole group connection of said one or more concentrators.

* * * * *